United States Patent
Shuen

(10) Patent No.: US 6,910,793 B1
(45) Date of Patent: Jun. 28, 2005

(54) DECORATIVE STRUCTURE OF A CAR EXHAUST PIPE

(75) Inventor: Shun Tian Shuen, San Chung (TW)

(73) Assignee: Janchy Enterprise Co., Ltd., San Chung (TW)

( * ) Notice: Subject to any disclaimer, the term of this patent is extended or adjusted under 35 U.S.C. 154(b) by 10 days.

(21) Appl. No.: 10/256,148

(22) Filed: Sep. 27, 2002

(51) Int. Cl.[7] ........................................... F21W 101/00
(52) U.S. Cl. ...................... 362/545; 362/487; 362/546; 362/485
(58) Field of Search ................................. 362/487, 473, 362/540, 546, 543, 544, 545, 485

(56) References Cited

U.S. PATENT DOCUMENTS 6,471,377 B1 * 10/2002 Stegall ........................ 362/487
6,491,418 B1 * 12/2002 Chen ........................... 362/487

* cited by examiner

Primary Examiner—Laura K. Tso
(74) Attorney, Agent, or Firm—Bacon & Thomas

(57) ABSTRACT

Decorative structure of car exhaust pipe, including a hollow tubular body, an exhaust cap, a heat-insulating cap and a decorative article. The heat-insulating cap is enclosed in the exhaust cap for insulating the waste hot gas exhausted from the engine from the exhaust cap. The waste gas is exhausted from the exhaust opening of the heat-insulating cap, whereby the exhaust cap is prevented from being affected by the heat conduction of the waste hot gas and thus the heat will not be conducted to the decorative article. Therefore, the light emitting elements can be mounted in the decorative article without being damaged by the heat.

6 Claims, 5 Drawing Sheets

DECORATIVE STRUCTURE OF A CAR EXHAUST PIPE

BACKGROUND OF THE INVENTION

The present invention is related to a decorative structure of car exhaust pipe, which is applicable to various specifications of exhaust pipes. The decorative structure includes a heat-insulating cap for insulating the waste hot gas exhausted from the engine from the exhaust cap. Therefore, light emitting elements can be mounted in the decorative article without being damaged by the heat.

There are various kinds of decorative articles for cars. For example, a decorative article can be mounted on the exhaust pipe to beautify the appearance thereof. However, such decorative article fails to provide bright decorative effect at night. A light emitting electronic equipment can be directly added to the decorative article for the exhaust pipe. However, the electronic equipment is easy to be damaged by the hot waste gas exhausted from the engine.

SUMMARY OF THE INVENTION

It is therefore a primary object of the present invention to provide a decorative structure of car exhaust pipe. The decorative structure includes a heat-insulating cap for insulating the waste hot gas exhausted from the engine from the exhaust cap. Therefore, the light emitting elements can be mounted in the decorative article without being damaged by the heat. Accordingly, the decorative article can provide bright decorative effect at night.

It is a further object of the present invention to provide the above decorative structure in which a set of V-shaped ribs are formed on inner wall face of the heat-insulating cap above the exhaust hole thereof to help in holding the exhaust pipe of the car and prevent the exhaust pipe from blocking the exhaust hole. Therefore, the waste gas can be successfully exhausted. By means of the V-shaped ribs, the decorative structure is applicable to various specifications of exhaust pipes.

The present invention can be best understood through the following description and accompanying drawings wherein:

DETAILED DESCRIPTION OF THE PREFERRED EMBODIMENTS

Figure 1:
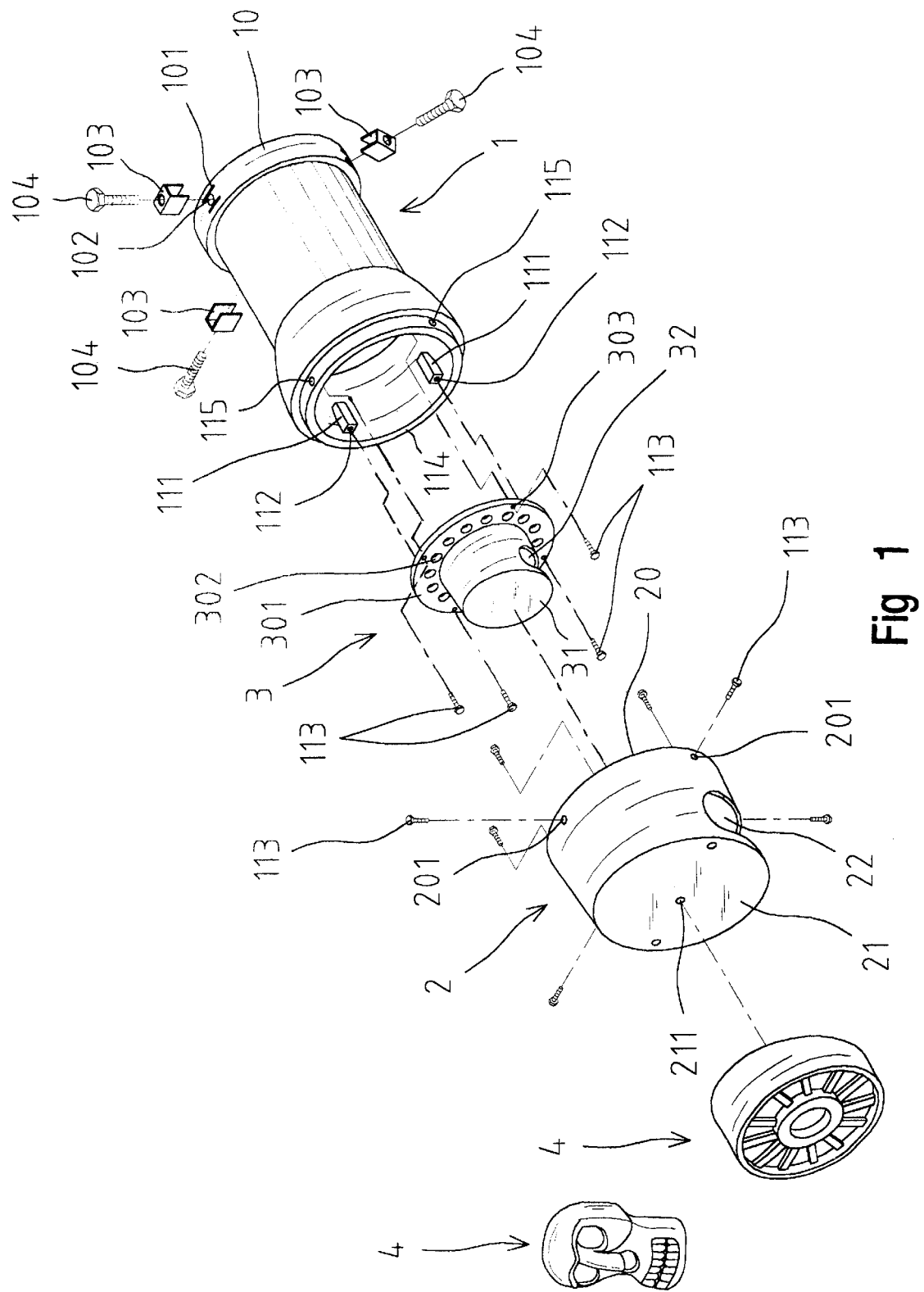
FIG. 1 is a perspective exploded view of the present invention.
Figure 2:
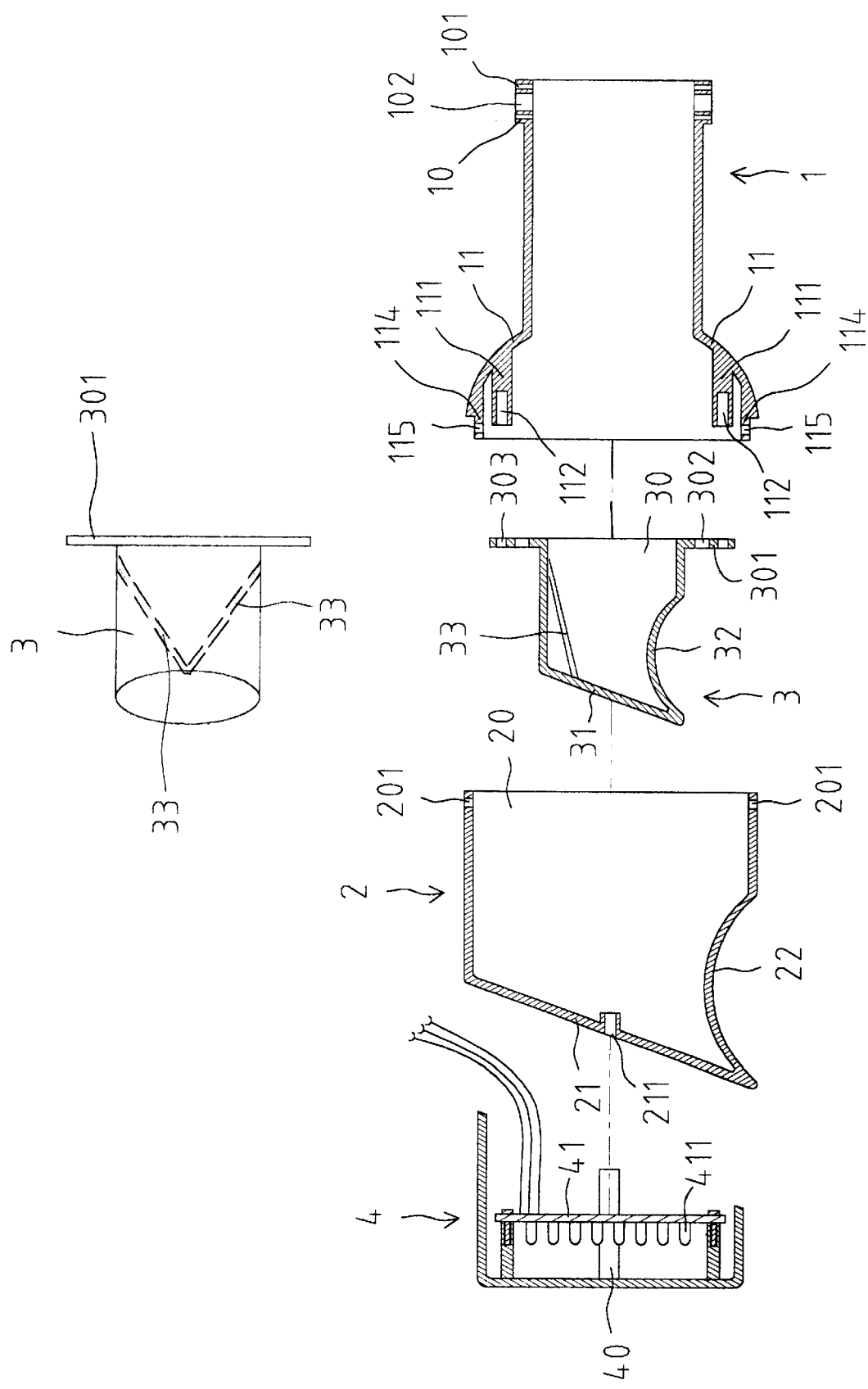
FIG. 2 is a sectional exploded view of the present invention.

Please refer to FIGS. 1 and 2. The decorative structure of car exhaust pipe of the present invention includes a tubular body 1, an exhaust cap 2, a heat-insulating cap 3 and a decorative article 4.

The tubular body 1 is fitted around the car exhaust pipe. One end of the tubular body 1 is formed with a flange 10. The flange 10 is formed with multiple parallel insertion slits 101 and through holes 102 at equal intervals. A tightening plate 103 is inserted in each insertion slit 101. A screw 104 is passed through each through hole 102 to fix the tightening plate 103. When the tubular body 1 is fitted onto the exhaust pipe, by means of tightening the screws 104 to press the tightening plates 103, the tubular body 1 is firmly fixed with the exhaust pipe. The other end of the tubular body 1 is formed with a trumpet-shaped pivot section 11. Multiple connecting columns 111 are evenly distributed along the inner circumference of the pivot section 11. The end face of each connecting column 111 is formed with a thread hole 112 for connecting with the heat-insulating cap 3. Screws 113 are passed through locating holes 303 of the heat-insulating cap 3 to connect the heat-insulating cap 3 with the tubular body 1. The outer end of the pivot section 11 is further formed with an annular stepped connecting section 114 formed with multiple through holes 115. Screws 113 are passed through the through holes 115 to lock the exhaust cap 2 with the tubular body 1.

One end of the exhaust cap 2 is an open end 20, while the other end thereof is a slope end 21. The exhaust cap 2 is hollow. The circumference of the open end 20 is formed with through holes 201 corresponding to the through holes 115 of the connecting section 114. Screws 113 are passed through the through holes to lock the exhaust cap 2 with the tubular body 1. The center of the slope end 21 is formed with multiple connecting holes 211 for connecting with the decorative article 4. The circumference of the exhaust cap 2 is formed with an exhaust hole 22 under the slope end 21 for exhausting waste gas.

The heat-insulating cap 3 has a profile similar to the exhaust cap 2. However, the diameter of the heat-insulating cap 3 is slightly smaller than that of the exhaust cap 2 so that the heat-insulating cap 3 can be hidden in the exhaust cap 2. The heat-insulating cap 3 also has an open end 30 and a slope end 31 and is hollow. The circumference of the open end 30 is formed with an annular flange 301. Multiple heat-radiating holes 302 and locating holes 303 are evenly distributed on the flange 301. Screws 113 are passed through the locating holes 303 and screwed into the thread holes 112 of the connecting columns 111 of the pivot section 11 to lock the heat-insulating cap 3 with the tubular body 1. The circumference of the heat-insulating cap 3 is formed with an exhaust hole 32 under the slope end 31. A set of V-shaped ribs 33 are formed on inner wall face of the heat-insulating cap 3 above the exhaust hole 32 to help in holding the exhaust pipe of the car and prevent the exhaust pipe from blocking the exhaust hole 32 so as to successfully exhaust the waste gas. The present invention is applicable to various specifications of exhaust pipes.

Figure 3:
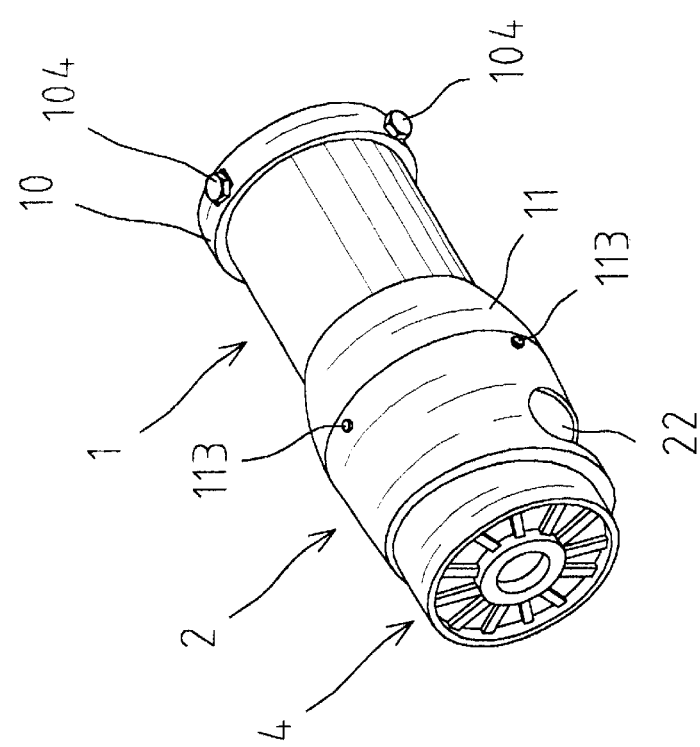
FIG. 3 is a perspective assembled view of the present invention.
Figure 5:
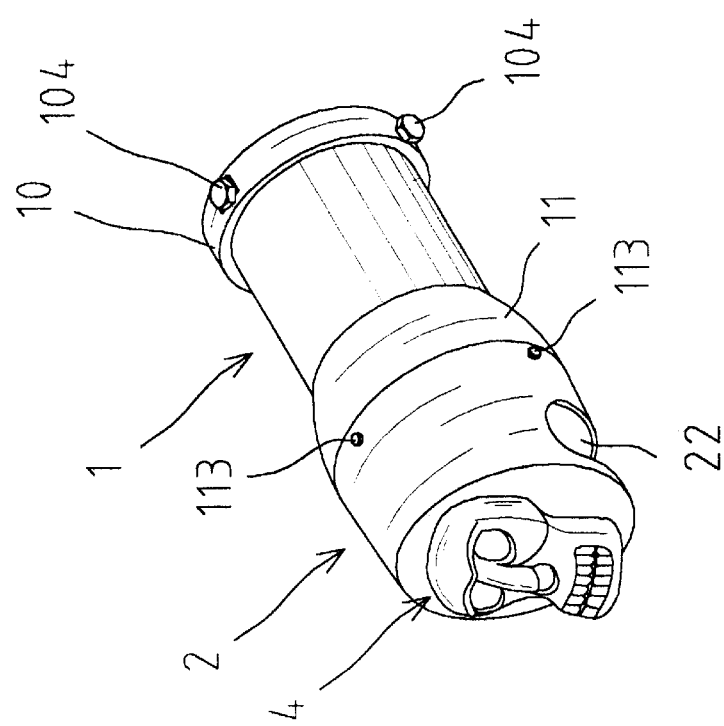
FIG. 5 is a perspective assembled view of another embodiment of the present invention.

The decorative article 4 is freely replaceable to highlight personal style as shown in FIGS. 3 and 5. The center of inner side of the decorative article 4 is formed with an elongated post 40. A circuit board 41 is disposed in the decorative article 4 and two ends of the circuit board 41 are formed with two short posts 40 for inserting into the connecting holes 211 of the slope end 21 of the exhaust cap 2. Screws 113 are used to lock the decorative article 4. Multiple light emitting diodes 411 are arranged on the surface of the circuit board 41 for flickering. At night, the decorative article 4 provides bright decorative effect.

Figure 4:
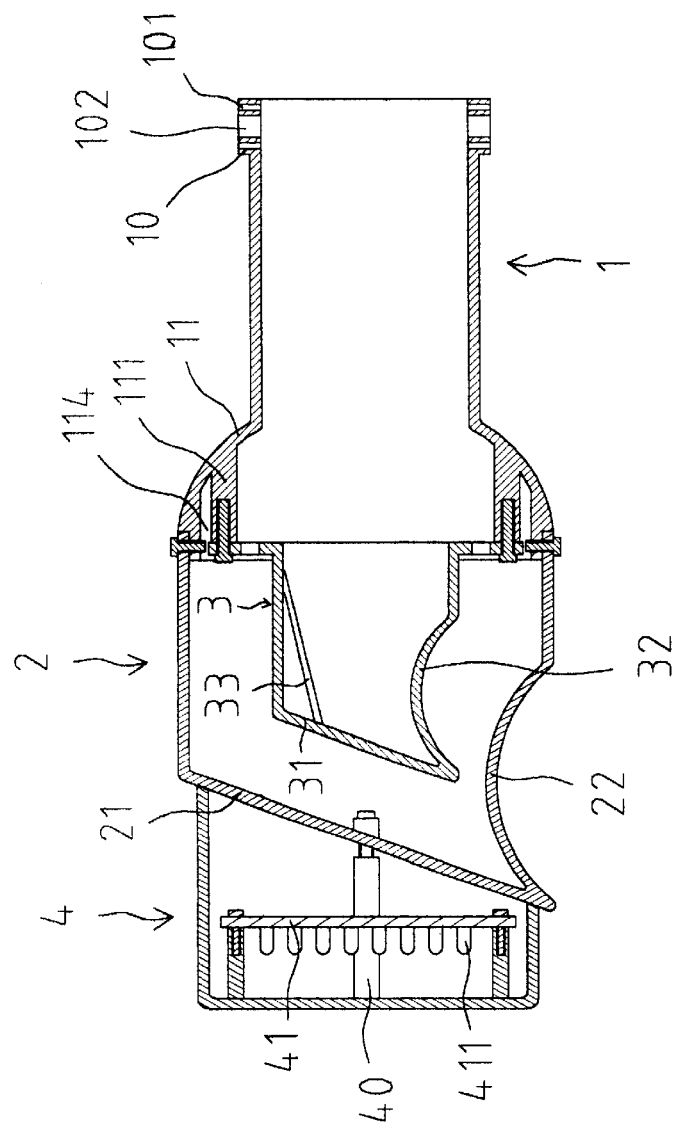
FIG. 4 is a sectional assembled view of the present invention.

When assembled, the heat-insulating cap 3 is first connected with the hollow tubular body 1 by screws 113. Then the exhaust cap 2 is connected with the decorative article 4 and then connected with the tubular body 1 to form a pattern as shown in FIGS. 3 and 4. In use, the entire tubular body 1 is fitted around the exhaust pipe of the car with the exhaust pipe abutting against the V-shaped ribs 33 of inner wall face of the heat-insulating cap 3. Then the screws 104 are tightened to press the tightening plates 103 of the flange 10 of the tubular body 1 so as to tightly fit with the exhaust pipe. Accordingly, by means of the decorative article 4 and the light emitting diodes 411 mounted therein, the personal style can be highlighted and a bright decorative effect is achieved at night.

The light emitting electronic elements in the decorative article will not be damaged by the waste hot gas exhausted from the engine. Moreover, the decorative structure is applicable to various specifications of exhaust pipes.

The above embodiments are only used to illustrate the present invention, not intended to limit the scope thereof. Many modifications of the above embodiments can be made without departing from the spirit of the present invention.

What is claimed is:

1. Decorative structure of car exhaust pipe, comprising a hollow tubular body, an exhaust cap, a heat-insulating cap and a decorative article, said decorative structure being characterized in that one end of the tubular body is for a car exhaust pipe to fit therein, the other end of the tubular body being for the heat-insulating cap to insert therein and connect therewith, one end of the exhaust cap being an open end, while the other end thereof being a slope end, the exhaust cap being fitted around the heat-insulating cap, the open end of the exhaust cap being connected with the tubular body, the decorative article being disposed on outer side of the slope end of the exhaust cap, a circuit board being disposed in the decorative article, multiple light emitting diodes being arranged on the circuit board, the heat-insulating cap being enclosed in the exhaust cap for insulating the waste hot gas exhausted from the exhaust cap, the waste gas being exhausted from an exhaust opening of the heat-insulating cap, whereby the exhaust cap is prevented from being affected by the heat conduction of the waste hot gas and thus the heat will not be conducted to the decorative article so that the internal light emitting elements of the decorative article are protected from being damaged by the heat.

2. Decorative structure of car exhaust pipe as claimed in claim 1, wherein a set of V-shaped ribs are formed on inner wall face of the heat-insulating cap above the exhaust hole thereof to help in holding the exhaust pipe of the car and prevent the exhaust pipe from blocking the exhaust hole so as to successfully exhaust the waste hot gas, by means of the V-shaped ribs, the decorative structure being applicable to various specifications of exhaust pipes.

3. Decorative structure of car exhaust pipe as claimed in claim 1, wherein one end of the tubular body is formed with a flange, the flange being formed with multiple insertion slits and through holes at equal intervals, a tightening plate being inserted in each insertion slit, a screw being passed through each hole to fix the tightening plate, whereby when the tubular body is fitted onto the exhaust pipe, by means of tightening the screws to press the tightening plates, the tubular body is firmly fixed with the exhaust pipe.

4. Decorative structure of car exhaust pipe as claimed in claim 1, wherein the circumference of the exhaust cap is formed with an exhaust hole under the slope end for exhausting waste gas.

5. Decorative structure of car exhaust pipe as claimed in claim 1, wherein a center of the slope end of the exhaust cap is formed with multiple connecting holes for connecting with the decorative article by means of screws, whereby the decorative article is replaceable.

6. Decorative structure of car exhaust pipe as claimed in claim 1, wherein the heat-insulating cap has an open end and a slope end and is hollow, a circumference of the open end being formed with an annular flange, multiple heat-radiating holes being evenly distributed on the flange for facilitating exhaustion of the waste gas.

* * * * *